United States Patent
Kono et al.

(10) Patent No.: US 9,521,095 B2
(45) Date of Patent: Dec. 13, 2016

(54) TRANSPORT SYSTEM AND TRANSPORT APPARATUS

(71) Applicant: Hitachi, Ltd., Tokyo (JP)

(72) Inventors: Masashi Kono, Tokyo (JP); Satoshi Tsutsumi, Tokyo (JP); Hidehiro Toyoda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 94 days.

(21) Appl. No.: 14/640,722

(22) Filed: Mar. 6, 2015

(65) Prior Publication Data

US 2015/0281129 A1 Oct. 1, 2015

(30) Foreign Application Priority Data

Mar. 27, 2014 (JP) .................................. 2014-065043

(51) Int. Cl.
  *H04L 12/46* (2006.01)
  *H04N 21/43* (2011.01)
  *H04L 12/931* (2013.01)
  *H04J 3/16* (2006.01)
  *H04L 25/14* (2006.01)

(52) U.S. Cl.
  CPC .............. *H04L 49/70* (2013.01); *H04J 3/1664* (2013.01); *H04L 25/14* (2013.01); *H04J 2203/0082* (2013.01); *H04J 2203/0085* (2013.01)

(58) Field of Classification Search
  CPC .............. H04L 12/4604; H04L 12/4641; H04L 49/354; H04N 21/4341
  See application file for complete search history.

(56) References Cited

U.S. PATENT DOCUMENTS

| | | | | |
|---|---|---|---|---|
| 8,824,504 B2* | 9/2014 | Zou | ..................... | H04Q 11/0067 370/395.51 |
| 8,873,591 B2* | 10/2014 | Ghiasi | ..................... | H04J 3/047 370/535 |
| 9,323,627 B1* | 4/2016 | Kulkarni | ............... | G06F 11/181 |
| 2007/0263535 A1* | 11/2007 | Shabtay | .................. | H04L 12/66 370/230 |

(Continued)

FOREIGN PATENT DOCUMENTS

| JP | 2003-143097 | 5/2003 |
| JP | 2005-269507 | 9/2005 |
| JP | 2012-142692 | 7/2012 |

*Primary Examiner* — Andrew Lee
(74) *Attorney, Agent, or Firm* — Mattingly & Malur, PC

(57) ABSTRACT

It is provided a transport apparatus including: a port information management unit for obtaining port information which includes a type first interfaces, a transport rate of first interfaces, and a physical lane count from the first interfaces into the transport apparatus, and for determining, based on the obtained port information, a virtual lane count into which the physical lanes from the first interfaces are converted; virtual lane creating units for setting as many virtual lanes as the determined virtual lane count; a lane information creating unit for creating, based on the port information, lane information which associates the first interfaces, the physical lane count, and identification information of virtual lanes in association with the physical lanes; and a multiplexing unit for multiplexing data that is transported along the virtual lanes, and for inserting the lane information in an invalid data field which is generated when the data is multiplexed.

6 Claims, 15 Drawing Sheets

(56) References Cited

U.S. PATENT DOCUMENTS

| | | | | |
|---|---|---|---|---|
| 2008/0138075 A1* | 6/2008 | Gustlin | .................. | H04L 47/10 398/115 |
| 2009/0141710 A1* | 6/2009 | Wu | ..................... | H04L 12/2867 370/354 |
| 2010/0281343 A1* | 11/2010 | Caggioni | ............. | H03M 13/05 714/776 |
| 2011/0032945 A1* | 2/2011 | Mullooly | ................ | H04L 45/58 370/401 |
| 2013/0083810 A1* | 4/2013 | Ghiasi | ................... | H04J 3/047 370/535 |
| 2014/0286346 A1* | 9/2014 | Ghiasi | .................... | H04L 45/60 370/401 |
| 2016/0056886 A1* | 2/2016 | Kitamura | ............. | H04L 49/552 398/5 |

* cited by examiner

| OPTICAL TRANSCEIVER TYPE | TRANSPORT RATE (a) | PHYSICAL LANE COUNT (b) | VIRTUAL LANE (VL) COUNT (c) $c=(a \times b)/x$ |
|---|---|---|---|
| 8GFC | 8.5Gbps | 1 | 2 |
| 10GbE | 10.3125Gbps | 1 | 2 |
| 16GFC | 14.5Gbps | 1 | 3 |
| 32GFC | 28.05Gbps | 1 | 6 |
| 40GbE | 10.3125Gbps | 4 | 8 |
| 100GbE | 10.3125Gbps | 10 | 20 |
| 100GbE | 25.753125Gbps | 4 | 20 | x : SET RATE (EXAMPLE : 6.5Gbps)

| TRANSMISSION APPARATUS-SIDE VL NUMBER | RECEPTION APPARATUS-SIDE VL NUMBER | VL INFORMATION (BIT PATTERN) |
|---|---|---|
| 1 | 1 | 00010001 |
| 2 | 2 | 00100010 |
| 3 | 3 | 00110011 |
| 4 | 4 | 01000100 |
| 5 | 5 | 01010101 |
| 6 | 6 | 01100110 |
| 7 | 7 | 01110111 |
| 8 | 8 | 10001000 |
| 9 | 9 | 10011001 |
| 10 | 10 | 10101010 |
| 11 | 11 | 10111011 |
| 12 | 12 | 11001100 |
| 13 | 13 | 11011101 |

66bit { | 10 | 0x1E | VL INFORMATION | RANDOM PATTERN |

FIG. 9

TRANSPORT SYSTEM AND TRANSPORT APPARATUS

CLAIM OF PRIORITY

The present application claims priority from Japanese patent application JP 2014-65043 filed on Mar. 27, 2014 the content of which is hereby incorporated by reference into this application.

BACKGROUND OF THE INVENTION

This invention relates to transport of signals of different protocols.

With the increase in communication traffic, networks are being demanded to be faster and larger in capacity. Large-capacity transport owing to data multiplexing has come to be used in backbone communication networks that connect line concentrators, bases, or providers' networks to each other. Examples of this large-capacity transport include Synchronous Digital Hierarchy/Synchronous Optical Network (SDH/SONET) in which low-rate signals are multiplexed into a signal of a predetermined rate to be transported as the signal, and Optical Transport Network (OTN) which accomplishes large-capacity transport by employing the concept of an optical path that is suitable for wavelength division multiplexing (WDM).

In this situation, for example, in JP 2003-143097 A, there is disclosed a technology in which the detection of synchronization among a plurality of frame rates in SDH or SONET is accomplished with a single circuit. In recent years, the diversification of signals (protocols) coupled to a network, which reflects their different uses, has also been observed. The link layer, for instance, has a mixture of various protocols such as Ethernet (trademark), Fibre Channel, and InfiniBand.

In JP 2012-142692 A, there is disclosed a technology with which pieces of equipment use a two-way communication line to hold communication to and from each other and to determine a transport path configuration for transporting digital signals between the pieces of equipment, such as the count of lanes to be used, the lane numbers of the lanes to be used, the transport direction, and the carrier clock frequency. A technology of transferring apparatus monitoring/control information with the use of a padding field is disclosed in JP 2005-269507 A.

The technology disclosed in JP 2003-143097 A detects, on the premise that transported signals are in the formats of SDH and SONET which are networks using synchronization protocols that heavily rely on accurate and stable clocks, multiple rates by detecting synchronization detection patterns unique to the respective formats. This technology therefore cannot detect signals of, for example, Ethernet which runs on asynchronous clocks.

Ethernet (trademark, the same applies hereinafter), which is capable of multiplexing signals that operate on asynchronous clocks, multiplexes signals by encoding processing, and is dependent on particular protocols because different protocols use different types of encoding, for example, 8B/10B encoding for 10 GbE (E is an abbreviation for Ethernet), and 64B/66B encoding for 100 GbE. In addition, in multi-rate transport Ethernet where, for example, transport by 10 gigabits per second (Gbps)×4 lanes is used for 40-Gb Ethernet and transport by 10 Gbps×10 lanes or 20 Gbps×4 lanes is used for 100 GbE, simply detecting the transport rates of the respective lanes does not help to discriminate 40 GbE and 100 GbE from each other.

The technology disclosed in JP 2012-142692 A uses Extended Display Identification Data (EDID) read out of equipment to determine whether the High Definition Multimedia Interface (HDMI) standard, which is used in AV systems, of the equipment is new or old, and therefore cannot be applied to communication apparatus and the like. The technology disclosed in JP 2005-269507 A monitors the packet length and, when a packet is smaller than a given packet size, determines that the packet has a padding field and inserts monitoring information. The technology of JP 2005-269507 A is therefore not applicable to processing in the physical layer where packet processing is not executed.

The technology disclosed in JP 2012-142692 A detects multiple rates with the use of an optical module code which is identification information indicating the type of an optical module. This technology is therefore not applicable to apparatus in which an optical module is not installed.

SUMMARY OF THE INVENTION

It is an object of this invention to make data transport efficient.

An aspect of the invention disclosed in this application is a transport system, including: a first transport apparatus for transporting data that is received by a plurality of first interfaces; and a second transport apparatus for receiving data that is transported from the first transport apparatus and transmitting the data from a plurality of second interfaces, the first transport apparatus including: a port information management unit for obtaining, for each of the plurality of first interfaces, port information which includes a type of the each of the plurality of first interfaces, a transport rate of the each of the plurality of first interfaces, and a physical lane count of physical lanes leading from the each of the plurality of first interfaces into the first transport apparatus, and for determining, based on the obtained port information, a virtual lane count of virtual lanes into which the physical lanes leading from the each of the plurality of first interfaces are converted; virtual lane creating units, which are each connected to physical lanes leading from the each of the plurality of first interfaces, for setting, for the each of the plurality of first interfaces, as many virtual lanes as the virtual lane count determined by the port information management unit; a lane information creating unit for creating, based on the port information, lane information which associates the each of the plurality of first interfaces, the physical lane count of physical lanes leading from the each of the plurality of first interfaces, and identification information of virtual lanes that are set by the virtual lane creating units in association with the physical lanes; and a multiplexing unit for multiplexing data that is transported along the virtual lanes, and for inserting the lane information which has been created by the lane information creating unit in an invalid data field which is generated when the data is multiplexed, the second transport apparatus including: a demultiplexing unit for receiving the multiplexed data which has been multiplexed by the multiplexing unit, and for obtaining the lane information while demultiplexing the multiplexed data for the each of the plurality of first interfaces separately; and physical lane creating units, which are connected to virtual lanes leading from the demultiplexing unit, for setting, based on the lane information obtained by the demultiplexing unit, for each of the plurality of second interfaces, physical lanes that are connected to the each of the plurality of second interfaces.

According to the exemplary embodiment of this invention, it is possible to make the data transport efficient. Other objects, configurations, and effects than those described above are clarified by the following description of an embodiment.

BRIEF DESCRIPTION OF THE DRAWINGS

FIG. 9 is an explanatory diagram illustrating an example of the block format.

DETAILED DESCRIPTION OF THE PREFERRED EMBODIMENT

Figure 1:
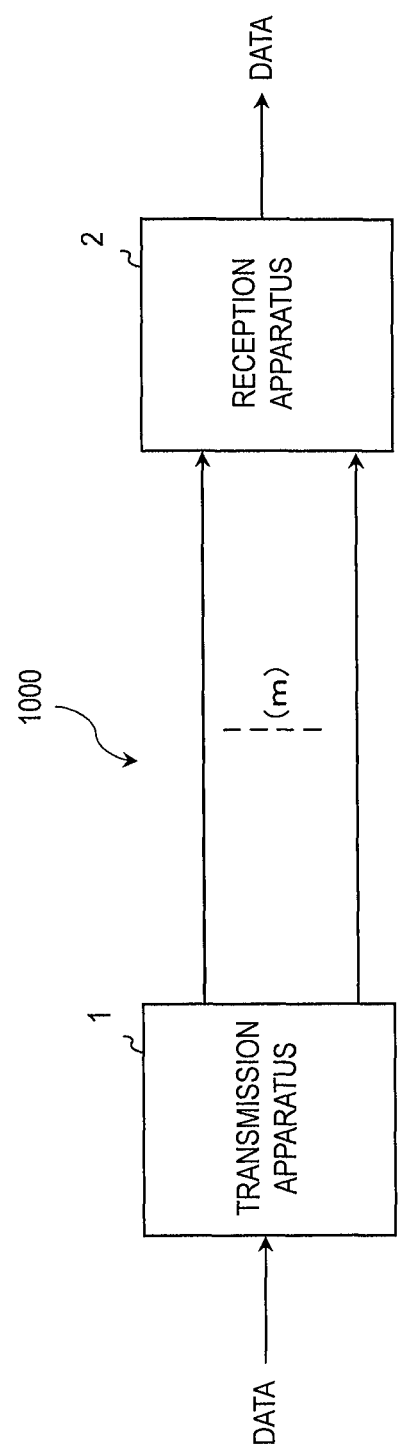
FIG. 1 is an explanatory diagram illustrating Configuration Example 1 of a transport system.

The following description of an embodiment of this invention is divided into a plurality of embodiments or a plurality of sections if necessary for convenience. However, unless explicitly noted otherwise, the embodiments or sections are not irrelevant to one another, and one is related to another as a modification example, detailed or supplementary description, or the like of a part of or the entirety of the other. When the count of pieces of a component or the like (including the count, numerical value, amount, and range of a component) is mentioned in the following description of an embodiment of this invention, this invention is not limited to the particular count mentioned and the component count can be higher or lower than the particular count, unless explicitly noted otherwise or unless it is theoretically obvious that the component count is limited to the particular count.

It should be understood that, in the following description of an embodiment of this invention, a component (including a constituent step) is not always indispensable unless explicitly noted otherwise or unless it is theoretically obvious that the component is indispensable. Similarly, when the shapes, positional relations, and the like of components are mentioned in the following description of an embodiment of this invention, shapes and the like that are substantially approximate to or similar to the ones mentioned are included unless explicitly noted otherwise or unless it is theoretically obvious that it is not the case. The same applies to the numerical value and the range in the preceding paragraph.

In the following description of an embodiment of this invention, "transport lane" is a collective term for physical lanes, virtual lanes, Physical Coding Sublayer (PCS) lanes, and the like, and is not limited to physical transport paths.

A transport system, receiving apparatus, transmitting apparatus, and communication apparatus according to an embodiment of this invention in one example have a plurality of physical ports and transport data in a network where various link-layer protocols are used mixedly.

The communication apparatus is an apparatus that has both a transmission function of a transmitting apparatus for transmitting data and a reception function of a receiving apparatus for receiving data. A transport system is a system that includes one of a configuration for transporting data from a transmitting apparatus to a receiving apparatus, a configuration for transporting data from a transmitting apparatus to a communication apparatus, a configuration for transporting data from a communication apparatus to a receiving apparatus, and a configuration for transporting data from one communication apparatus to another communication apparatus. A transmitting apparatus and a communication apparatus may be configured so as to multiplex data and transmit the multiplexed data. A receiving apparatus and a communication apparatus may be configured so as to demultiplex multiplexed data. The collective term herein for a transmitting apparatus, a receiving apparatus, and a communication apparatus is "transport apparatus".

An embodiment of this invention is described in detail below with reference to the drawings. The same components are denoted by the same reference symbols in principle throughout all drawings that illustrate the embodiment, and repetitive descriptions thereof are omitted.

<Configuration Example of a Transport System>

FIG. 1 is an explanatory diagram illustrating Configuration Example 1 of a transport system. The transport system 1000 of FIG. 1 includes a transmitting apparatus 1 and a receiving apparatus 2, and data is transported from the transmitting apparatus 1 to the receiving apparatus 2. The transmitting apparatus 1 and the receiving apparatus 2 are coupled to each other via transport paths which are m transport lanes.

Figure 2:
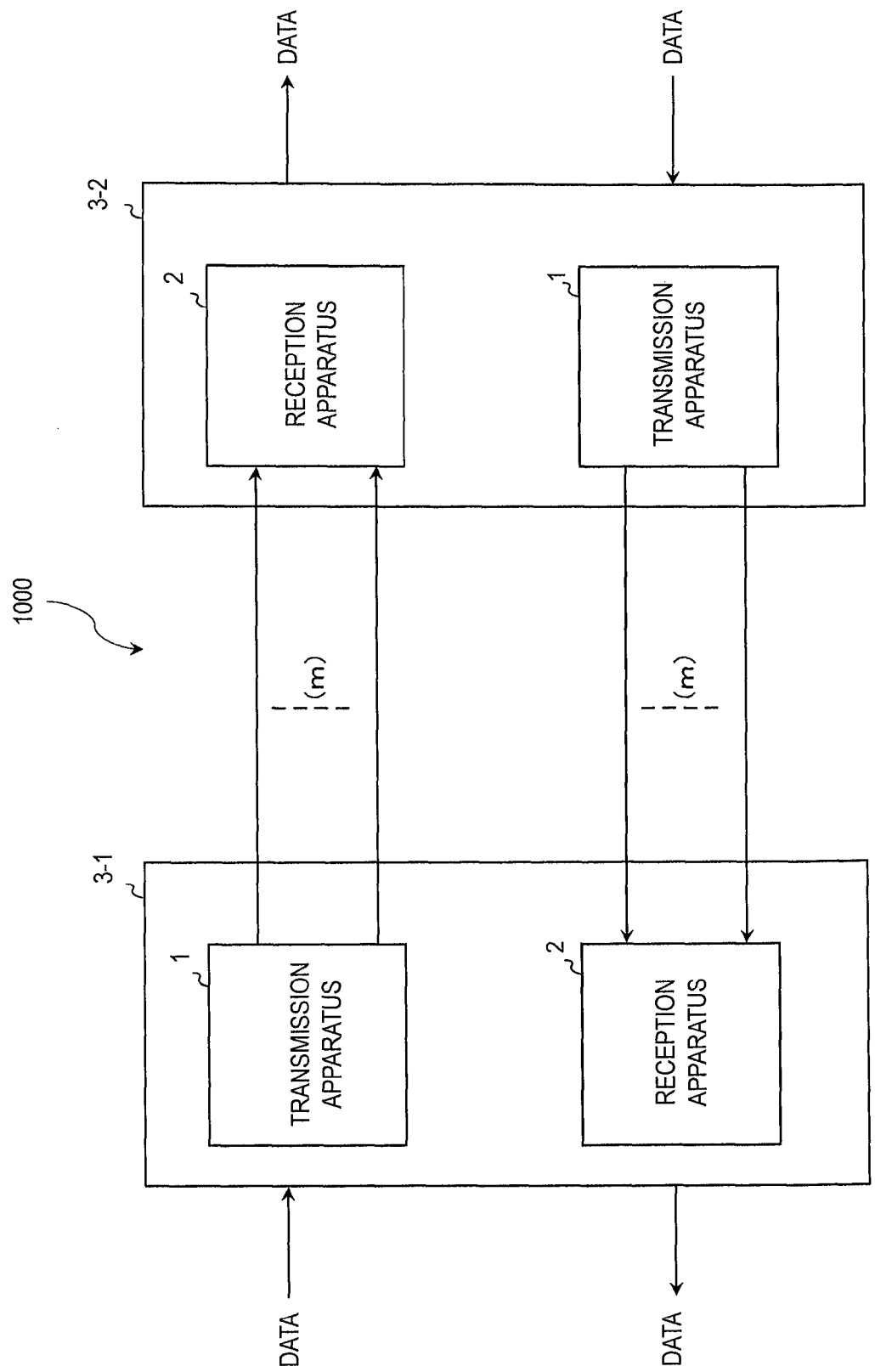
FIG. 2 is an explanatory diagram illustrating Configuration Example 2 of the transport system.

FIG. 2 is an explanatory diagram illustrating Configuration Example 2 of the transport system 1000. The transport system 1000 of FIG. 2 includes two communication apparatus, and data is transported from one of the communication apparatus that is denoted by 3-1 to the other communication apparatus denoted by 3-2. The communication apparatus 3-1 and the communication apparatus 3-2 each include the transmitting apparatus 1 and receiving apparatus 2 of FIG. 1.

Figure 3:
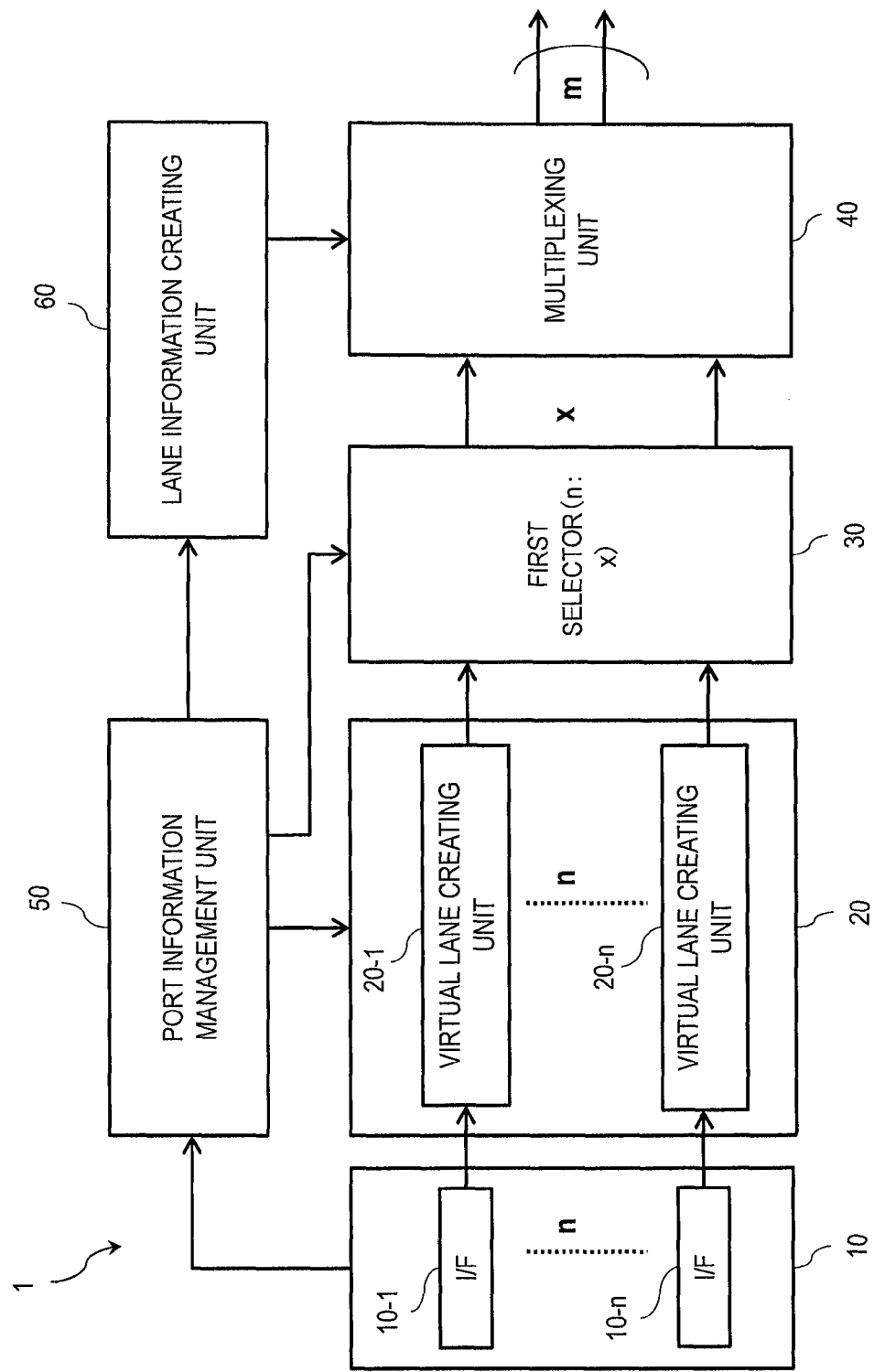
FIG. 3 is block diagram illustrating an example of the internal configuration of the transmission apparatus 1 of FIGS. 1 and 2.

FIG. 3 is block diagram illustrating an example of the internal configuration of the transmission apparatus 1 of FIGS. 1 and 2. The transmission apparatus 1 includes I/Fs 10, which includes n I/Fs denoted by 10-1 to 10-n, virtual lane creating units 20 (20-1 to 20-n), a first selector 30, a multiplexing unit 40, a port information management unit 50, and a lane information creating unit 60. The symbol n represents an integer of 1 or more.

Each of the n I/Fs 10-1 to 10-n has a physical port into which an optical transceiver is to be plugged. The n I/Fs 10-1 to 10-n input data frames (hereinafter referred to as transmission data) to be transmitted to the reception apparatus 2 via the optical transceivers plugged into the physical ports. The transport rate may differ from one physical port to another. The count of transport lanes belonging to one physical port may differ from the count of transport lanes belonging to another physical port. There is no need for every physical port to have a transport rate and a transport lane count that are different from those of any other physical port, and it is sufficient if one out of all physical ports has a transport rate or a transport lane count that is different from the transport rate or transport lane count of the other physical ports.

The transmission data input from the n I/Fs 10-1 to 10-n include, for example, digital signals of different bit rates, digital signals of different protocols, and digital signals transported at the same transport rate via a plurality of transport lanes. The pieces of transmission data input from the n I/Fs 10-1 to 10-are respectively input to their associated virtual lanes. The I/Fs 10-1 to 10-n each notify port information, which includes an optical transceiver type indicating what optical transceiver is plugged into the physical port of the I/F 10, a transport rate, and a physical lane count, to the port information management unit 50.

The port information management unit 50 obtains the port information notified by each of the I/Fs 10-1 to 10-n. The port information management unit 50 determines which virtual lane to use from the obtained port information, and notifies the determined virtual lane to the lane information creating unit 60 and the first selector 30. The port information management unit 50 also determines, based on the obtained port information, with the use of a conversion table described later, the count of virtual lanes into which physical lanes are converted, and notifies the determined virtual lane count to the relevant virtual lane creating unit 20.

The virtual lane creating unit 20 that is notified of the virtual lane count by the port information management unit 50 converts a physical lane into as many virtual lanes as the notified virtual lane count, and outputs received transmission data as transmission data to be transported along as many virtual lanes as the notified virtual lane count. Each virtual lane creating unit 20 has a demultiplexer, for example. The input side of the demultiplexer is connected to the relevant virtual lane creating unit 20 via a physical lane belonging to a physical port of the I/F 10 that is associated with the virtual lane creating unit 20.

The output side of the demultiplexer is connected to the first selector 30 via virtual lanes. The conversion from a physical lane into a virtual lane is executed by the demultiplexer. For instance, each virtual lane creating unit 20 gives to its demultiplexer a virtual lane count notified by the port information management unit 50, and sets as many virtual lanes as the notified virtual lane count. The transport capacity per virtual lane is adjusted to a set rate x, which is described later. Physical lanes leading to the respective virtual lane creating units 20 are converted into virtual lanes in this manner.

The first selector 30 selects transmission data to input based on the port information notified by the port information management unit 50 and on virtual lanes to be used, and outputs the selected transmission data to the demultiplexing unit 40. Specifically, when the port information is "10 GbE" and virtual lane numbers "1" and "2" are notified as virtual lanes to be used, for example, the first selector 30 chooses data that is transmitted along virtual lanes having the virtual lane numbers "1" and "2" from a 10 GbE I/F, and transmits the data to the multiplexing unit 40 via x transport lanes. The symbol x represents an integer of 1 or more.

The lane information creating unit 60 creates lane information and association relation information from the information about virtual lanes to be used (virtual lane numbers) which has been notified by the port information management unit 50. The lane information is information that associates the count of physical lanes used with virtual lane numbers for each I/F 10. In the case of the lane information in 10 GbE, for example, the used physical lane count is "2" and the virtual lane count is "2", and the virtual numbers are therefore "1" and "2". The association relation information is information that associates virtual lane numbers on this transmission apparatus 1 side with their associated virtual lane numbers on the reception apparatus 2 side.

When the virtual lane numbers of one I/F 10 on the reception apparatus 2 side are "1" and "2", for example, the virtual lane number "1" on the transmission apparatus 1 side is associated with the virtual lane number "1" on the reception apparatus 2 side, and the virtual lane number "2" on the transmission apparatus 1 side is associated with the virtual lane number "2" on the reception apparatus 2 side. The lane information creating unit 60 notifies the lane information and the association relation information to the multiplexing unit 40.

The multiplexing unit 40 multiplexes transmission data input from the first selector 30. The multiplexing unit 40 multiplexes the transmission data in, for example, the order of obtainment from the first selector 30, or ascending order of the virtual lane number, or ascending order of the virtual lane count. The multiplexing unit 40 also inserts the lane information and association relation information created by the lane information creating unit 60 into an invalid data field. The multiplexing unit 40 then transmits the transmission data to transport paths which are m transport lanes. The symbol m represents an integer of 1 or more.

Figure 4:
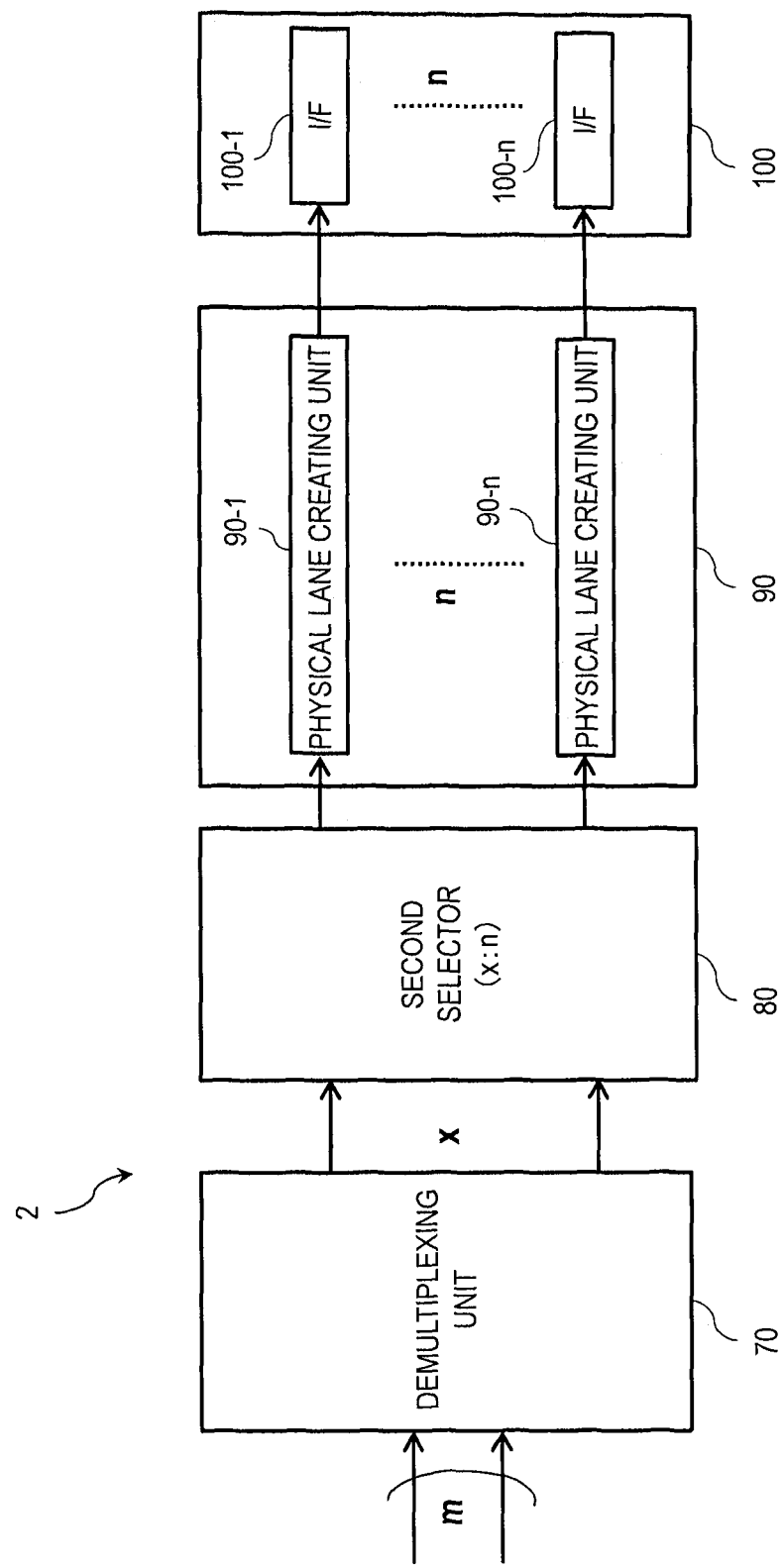
FIG. 4 is a block diagram illustrating an example of the internal configuration of the reception apparatus 2 of FIGS. 1 and 2.

FIG. 4 is a block diagram illustrating an example of the internal configuration of the reception apparatus 2 of FIGS. 1 and 2. The reception apparatus 2 includes a demultiplexing unit 70, a second selector 80, physical lane creating units 90 (90-1 to 90-n), and I/Fs 100, which include a plurality of I/Fs denoted by 100-1 to 100-n. The reception apparatus 2 outputs reception data frames (hereinafter referred to as reception data) from the I/Fs 100.

Transmission data multiplexed by the transmission apparatus 1 is input to the demultiplexing unit 70 via the m transport paths which are coupled to the transmission apparatus 1. The demultiplexing unit 70 demultiplexes the transmission data received via the m transport paths, in a manner that is defined by the lane information contained in the invalid data field of the transmission data, and outputs the demultiplexed data to the second selector 80.

The second selector 80 outputs the transmission data to the physical lane creating units 90 in a manner that is defined by the lane information and association relation information contained in the invalid data field. For instance, when the virtual lane numbers "1" and "2" on the transmission apparatus 1 side which are included in the lane information are associated by the association relation information with the virtual lane numbers "1" and "2" on the reception apparatus 2 side, the second selector 80 outputs transmission data that is associated with the virtual lane numbers "1" and "2" on the transmission apparatus 1 side to virtual lanes that have the virtual lane numbers "1" and "2" on the reception apparatus 2 side.

The physical lane creating units 90 respectively convert virtual lanes into physical lanes in a manner that is defined by the lane information contained in the invalid data field, and output the transmission data to the I/Fs 100. Each physical lane creating unit 90 has a multiplexer. The input side of the multiplexer is connected to the second selector 80 via a virtual lane. The output side of the multiplexer is connected to the relevant I/F 100 by a physical lane belonging to a physical port of the relevant I/F 100.

The conversion from a virtual lane into a physical lane is executed by the multiplexer. For instance, each physical lane creating unit 90 sets as many physical lanes as a physical lane count that is obtained from the lane information contained in the invalid data field. As in the transmission apparatus 1, the transport capacity per virtual lane is adjusted to the set rate x, which is described later. Virtual lanes leading to the respective physical lane creating units 90 are converted into physical lanes in this manner.

The I/Fs 100 include a plurality of I/Fs, 100-1 to 100-n. The configuration of the I/Fs 100 is the same as that of the I/Fs 10 of the transmission apparatus 1, and a description thereof is therefore omitted. In this example, an optical transceiver plugged into one of the I/Fs 10 (for example, 10-1) on the transmission apparatus 1 side and an optical transceiver plugged into the I/F 100 (for example, 100-1) that is associated with this I/F 10 are of the same type.

<Conversion Table>

Figure 5:
FIG. 5 is an explanatory diagram illustrating an example of the conversion table which is included in the port information management unit 50.

FIG. 5 is an explanatory diagram illustrating an example of the conversion table which is included in the port information management unit 50. The conversion table denoted by 500 is a table for determining a virtual lane count depending on the performance of the relevant I/F 10. The conversion table 500 includes an optical transceiver type, a transport rate, a physical lane count, and a virtual lane count. The optical transceiver type is information for identifying the type of an optical transceiver that is plugged into a physical port in question. The transport rate is a transport rate per channel [ch] of the physical port, namely, a transport rate per physical lane. The physical lane count is the count of physical lanes at the physical port. The optical transceiver type, the transport rate, and the physical lane count constitute the "port information". The association relation between a value of the optical transceiver type value, a value of the transport rate, and a value of the physical lane count is determined in advance by communication standards as shown in the conversion table 500. The virtual lane count is described below.

The total transport capacity is calculated by multiplying a per-channel [ch] transport rate (a) by a physical lane count (b). Virtual lanes and physical lanes satisfy the following Relational Expression (1).

$$a \times b = \text{per-virtual lane transport capacity} \times \text{virtual lane count } (c) \quad (1)$$

An operating clock frequency for executing processing in one virtual lane creating unit 20, the bit width [bit] of a signal line in the virtual lane creating unit 20, and a per-virtual lane transport capacity (the set rate x) satisfy the following Relational Expression (2).

$$\text{Operating clock frequency [MHz]} = x[\text{Gbps}]/\text{bit width [bit]} \quad (2)$$

From Relational Expressions (1) and (2), the following Relational Expression (3) is obtained:

$$\text{Virtual lane count } (C) = A/B \quad (3)$$

A=transport rate (a)×virtual lane count (b)
B=Operating clock frequency [MHz]×bit width [bit]

In this embodiment, the operating clock frequency and the bit width are assumed to be 400 megahertz (MHz) or lower and 64 bits or lower, respectively, and the per-virtual lane transport capacity (x) which is the set rate is 6.5 Gbps. The per-virtual lane transport capacity (x) can be changed by changing the operating clock frequency or the bit width.

The conversion table 500 associates values of the optical transceiver type, the transport rate, the physical lane count, and the virtual lane count with one another in this manner. The first row of the conversion table 500, for example, shows that, when an 8GFC optical transceiver (GFC stands for Giga Fibre Channel) is plugged into a physical port where the transport rate is 8.5 Gbps and the physical lane count is 1, the count of virtual lanes that are associated with this physical port is 2.

<Transport System Operation Example>

Figure 6:
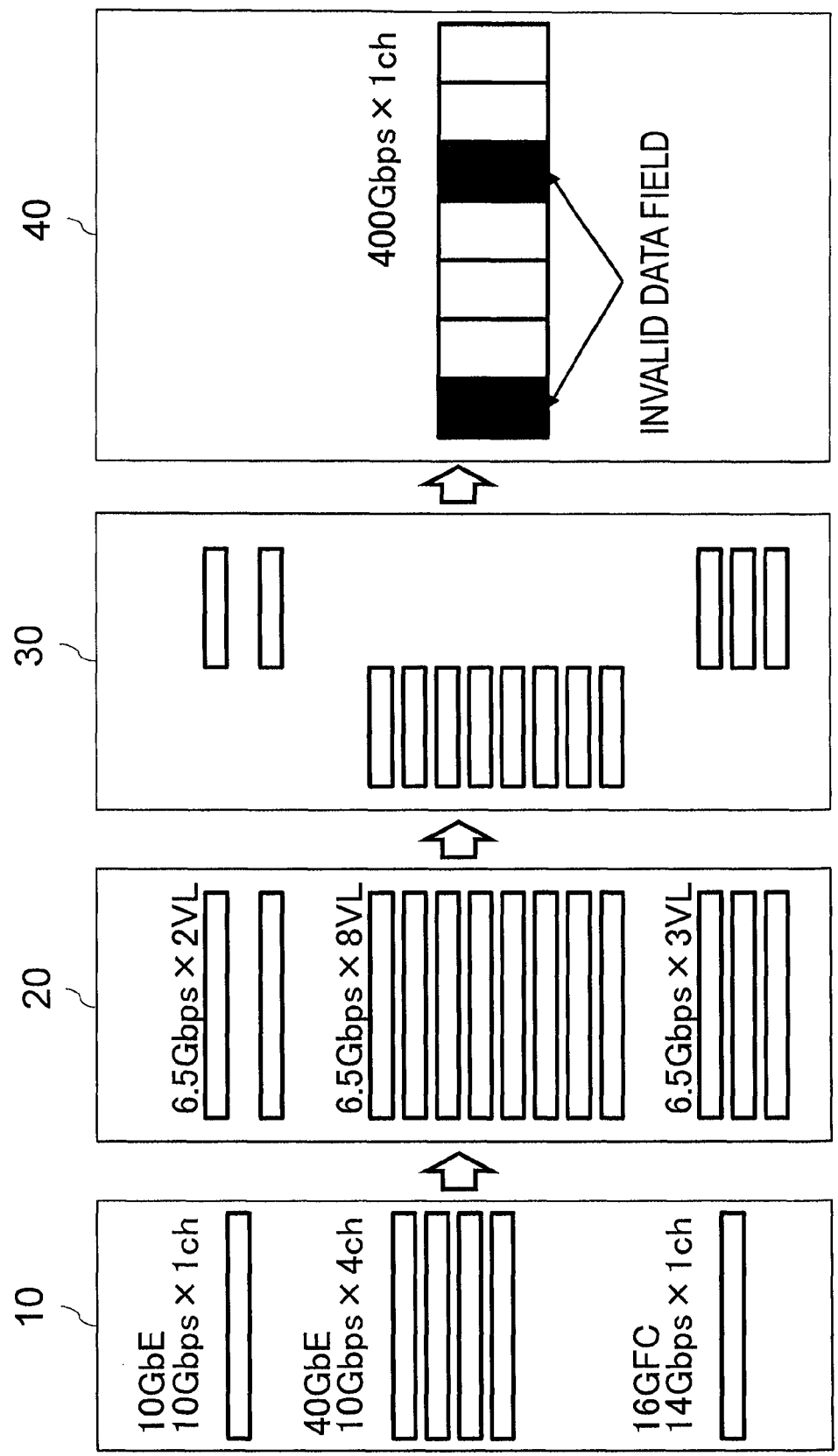
FIG. 6 is an explanatory diagram illustrating an operation example of the transmission apparatus 1 in the transport system.

FIG. 6 is an explanatory diagram illustrating an operation example of the transmission apparatus 1 in the transport system. A 10 GbE optical transceiver (GbE stands for Gigabit Ethernet), a 40 GbE optical transceiver, and a 16GFC optical transceiver (GFC stands for Giga Fibre Channel) are plugged into physical ports of the I/Fs 10 first. The I/F 10 where the 10 GbE optical transceiver is plugged in is turned into a physical lane of 10 Gbps×1 channel (ch) by the plugging in. The I/F 10 where the 40 GbE optical transceiver is plugged in is turned into physical lanes of 10 Gbps×4 ch by the plugging in. The I/F 10 where the 16GFC optical transceiver is plugged in is turned into a physical lane of 14 Gbps×1 ch by the plugging in. The channel count equals the physical lane count. Pieces of transmission data received by the respective optical transceivers are separately transmitted to the virtual lane creating units 20 via the physical lanes.

The port information management unit 50 receives, from each I/F 10 included in the transmission apparatus 1, the transport rate and physical lane count of a physical port that is used by the I/F 10, and determines the count of virtual lanes (VLs) to be set in the relevant virtual lane creating unit 20. For instance, when the set rate x is 6.5 Gbps and a 10 GbE optical transceiver, a 40 GbE optical transceiver, and a 16GFC optical transceiver are plugged in, the virtual lane counts for 10 GbE, 40 GbE, and 16GFC are determined as 2, 8, and 3, respectively, from the conversion table 500 of FIG. 5.

The virtual lane creating units 20 accordingly convert a physical lane of 10 GbE (10 Gbps×1 ch) into 6.5 Gbps×2 virtual lanes (VLs), convert physical lanes of 40 GbE (10 Gbps×4 ch) into 6.5 Gbps×8 VLs, and convert physical lanes of 16GFC (14 Gbps×1 ch) into 6.5 Gbps×3 VLs. Transmission data is transported along the virtual lanes created by the conversion.

The lane information creating unit 60 associates physical ports (ones into which optical transceivers are plugged) that are used by the I/Fs 100 included in the reception apparatus 2 with virtual lanes generated from physical ports (ones into which optical transceivers are plugged) that are used by the I/Fs 10 included in the transmission apparatus 1. The reception apparatus 2 in the example given here has a lane configuration in which optical transceivers are plugged in as in the transmission apparatus 1.

Figure 7:
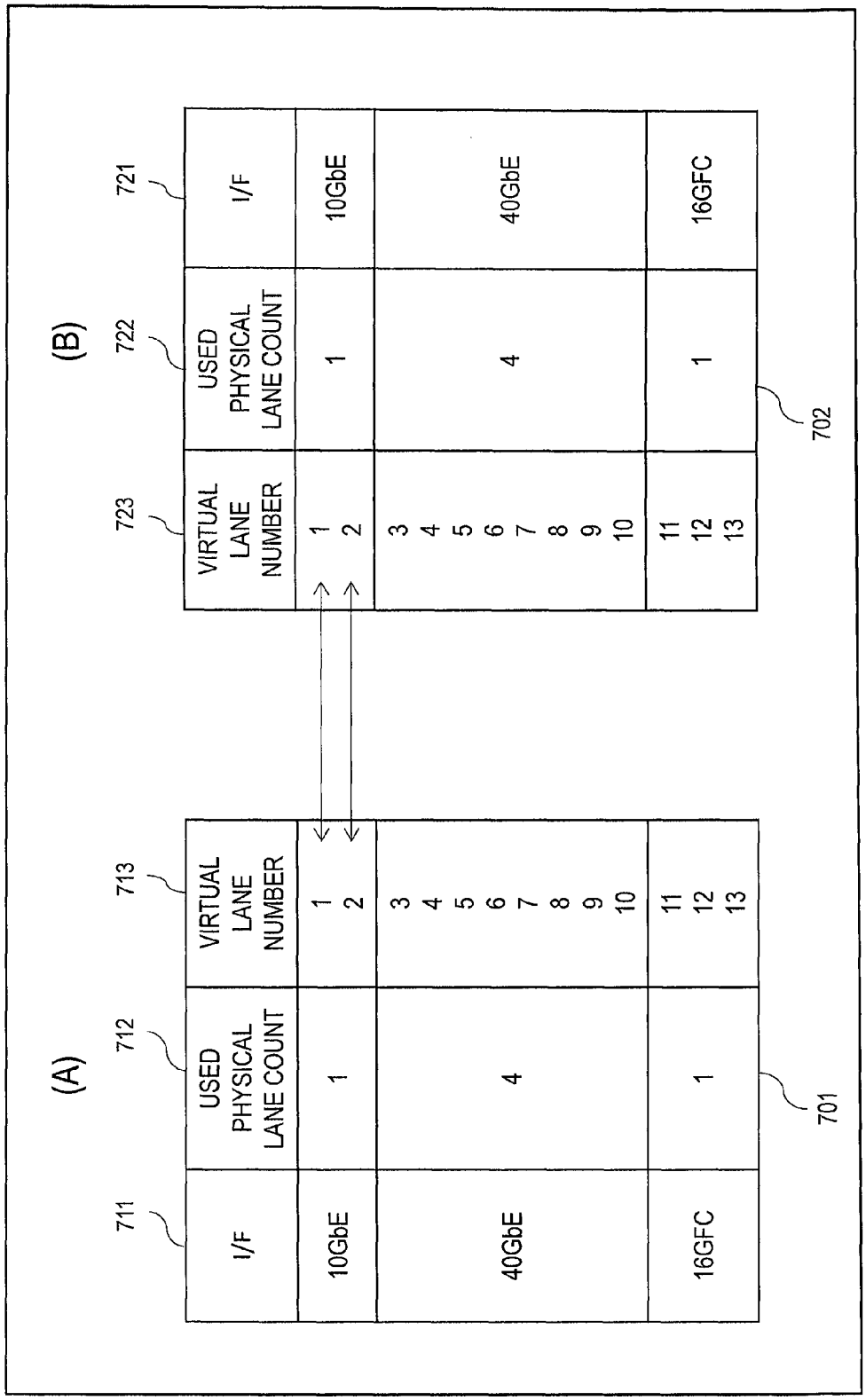
FIG. 7 is an explanatory diagram illustrating Lane Information Example 1 which is about lane information created by the lane information creating unit.

FIG. 7 is an explanatory diagram illustrating Lane Information Example 1 which is about lane information created by the lane information creating unit 60. (A) in FIG. 7 illustrates lane information 701 of the transmission apparatus 1, and (B) in FIG. 7 illustrates lane information 702 of the reception apparatus 2. The transmission apparatus 1 and the reception apparatus 2 have the same lane configuration, which makes an I/F 712 the same as an I/F 721, a used physical lane count 712 the same as a used physical lane count 722, and a virtual lane number 713 the same as a virtual lane number 723 in (A) and (B).

In this case, the I/F 10-1 (into which a 10 GbE optical transceiver is plugged) of the transmission apparatus 1 is associated with the I/F 100-1 (into which a 10 GbE optical transceiver is plugged) included in the reception apparatus 2. In other words, 6.5 Gbps×2 VLs generated from a physical lane of 10 GbE (10 Gbps×1 ch) in the transmission apparatus 1 are associated with the I/F 100-1 (10 GbE) included in the reception apparatus 2.

The port information management unit 50 associates the virtual lane numbers of associated virtual lanes with each other. For instance, the virtual lane numbers "1" and "2" of 10 GbE in the transmission apparatus 1 are associated with the virtual lane numbers "1" and "2" of 10 GbE in the reception apparatus 2 (the association relation information). The lane information 701 of the transmission apparatus 1 is inserted in an invalid data field by the multiplexing unit 40. The lane information 701 of the transmission apparatus 1 is taken out of the invalid data field by the reception apparatus 2 when the reception apparatus 2 receives the multiplexed transmission data, and is used as the lane information 702 of the reception apparatus 2. The transmission apparatus 1 determines virtual lanes on the reception apparatus 2 side in this manner.

Figure 8:
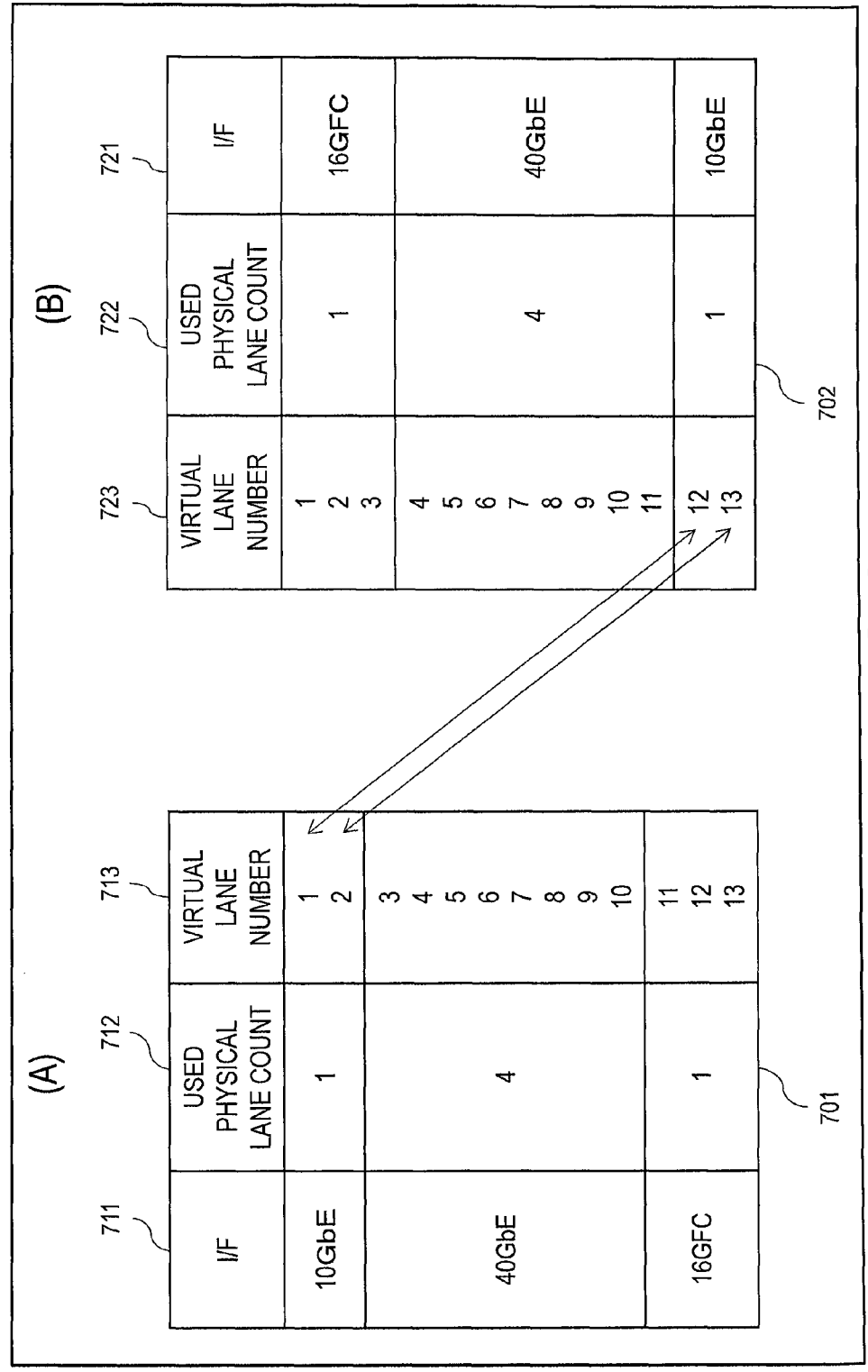
FIG. 8 is an explanatory diagram illustrating Lane Information Example 2 which is about lane information associated by the port information management unit.

FIG. 8 is an explanatory diagram illustrating Lane Information Example 2 which is about lane information associated by the port information management unit 50. In FIG. 8, in the reception apparatus 2, the optical transceivers are plugged into physical ports different from the ones in FIG. 7, and the virtual numbers therefore differ from those in FIG. 7. The virtual lane numbers "1" and "2" of 10 GbE in the transmission apparatus 1 in this case are associated with the virtual lane numbers "12" and "13" of 10 GbE in the reception apparatus 2. The association relation information is obtained in this manner. The reception apparatus 2 thus determines virtual lanes on the reception apparatus 2 side, unlike FIG. 7 where the transmission apparatus 1 determines reception apparatus-side virtual lanes.

The lane information creating unit 60 converts the virtual lane number association relation information received from the port information management unit 50 into a bit pattern to create a block format.

FIG. 9 is an explanatory diagram illustrating an example of the block format. The block format is, for example, data that is 66 bits in size and that includes a header (2 bits), an identifier (0×1E), VL information (8 bits), and a random pattern (48 bits). The lane information creating unit 60 converts the association relation information into a bit pattern that is 8 bits in size, and inserts the bit pattern as the VL information. The bit pattern of the VL information of FIG. 9 which is identified by the association relation information, namely, the combination of a virtual lane number in the transmission apparatus 1 and a virtual lane number in the reception apparatus 2, is an example of the VL information that is created when the lane information is as illustrated in FIGS. 7A and 7B.

Referring back to FIG. 6, the first selector 30 selects virtual lanes of physical ports that are determined from the port information of a port that is used and the virtual lane numbers of virtual lanes to be used, and transmits the transmission data to the multiplexing unit 40 in order. For example, when the port information of a port that is used is port information for 10 GbE and port information for 16GFC, a data string of 2 VLs and a data string of 3 VLs are transmitted to the multiplexing unit 40. In the case where the port information of a port that is used next is port information for 40 GbE, a data string of 8 VLs is transmitted to the multiplexing unit 40. When an upper limit to the count of lanes transmitted to the multiplexing unit 40 is 10 VLs, for example, 2 VLs and 3 VLs may be selected first, with 8 VLs selected next, or virtual lanes may be selected in order from the top until the 10-VL slot is filled up to transmit 10 VLs to the multiplexing unit 40 at once.

The multiplexing unit 40 multiplexes the transmission data received from the first selector 30 into 400 Gbps×1 ch. An invalid data field is generated by the multiplexing due to a difference between the transport rate of a transport lane and a band in which the data actually flows. The multiplexing unit 40 inserts the lane information and the association relation information in the invalid data field.

In the case where the multiplexing does not generate an invalid data field, the multiplexing unit 40 generates an invalid data field regularly. For instance, the multiplexing unit 40 generates an invalid data field once each time the multiplexing of valid data is executed sixteen times, and inserts the lane information and the association relation information in the generated invalid data field. Specifically, the multiplexing unit 40 counts, with a counter, the number of times an invalid data field has not been generated in succession, and, when the generation of invalid data field has not happened sixteen times in succession, for example, generates an invalid data field in the seventeenth multiplexing to insert the lane information and the association relation information in the invalid data field. The multiplexing unit 40 resets the counter after the insertion. The multiplexed transmission data is transported to the reception apparatus 2 via the m transport paths. The symbol m represents an integer of 1 or more.

Figure 10:
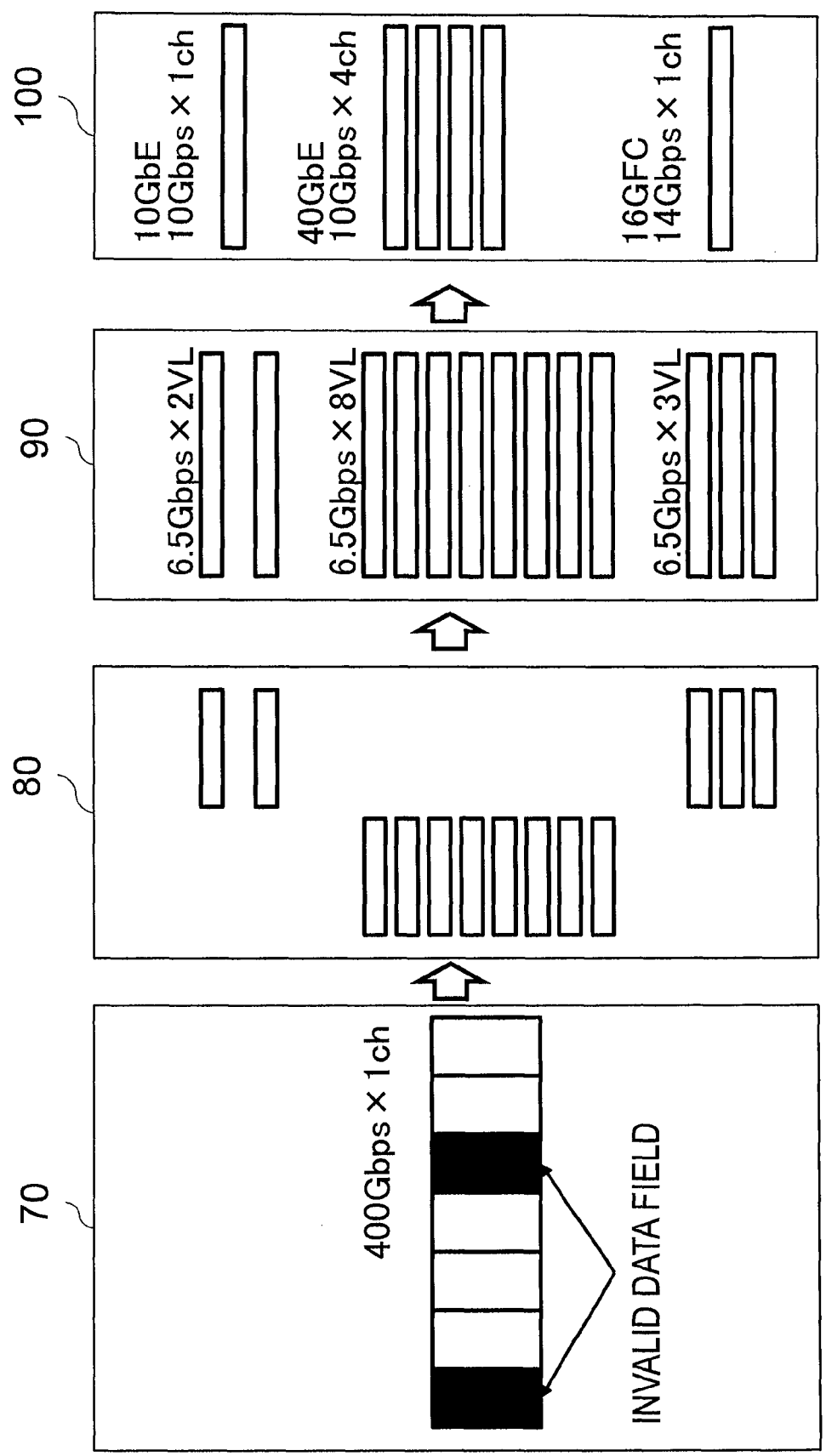
FIG. 10 is an explanatory diagram illustrating an operation example of the reception apparatus in the transport system.

FIG. 10 is an explanatory diagram illustrating an operation example of the reception apparatus 2 in the transport system. First, transmission data of 400 Gbps×1 ch is input to the demultiplexing unit 70 from the transmission apparatus 1 via the m transport paths. The demultiplexing unit 70 extracts the lane information and association relation information contained in an invalid data field, demultiplexes the multiplexed data, and transmits the demultiplexed transmission data to the second selector 80. The second selector 80 selects virtual lanes that are determined from the lane information and the association relation information, and transmits data strings to the physical lane creating units 90 in order. For example, when 10 GbE and 16GFC are identified from the lane information, a data string of 6.5 Gbps×2 VLs and a data string of 6.5 Gbps×3 VLs are transmitted to the physical lane creating units 90. In the case where the I/F 100 that is used next is for 40 GbE, a data string of 6.5 Gbps×8 VLs is transmitted to the physical lane creating units 90.

The second selector 80 also refers to the lane information 702 and the association relation information to notify the virtual lane numbers of the selected virtual lanes to the physical lane creating units 90. For example, in the case where the selected virtual lanes are ones on the reception apparatus 2 side that have the virtual lane numbers "1" and "2", the second selector 80 notifies a used physical lane count that is associated, to the physical lane creating unit 90 that is connected to the relevant I/F 100 (the I/F where a 10 GbE optical transceiver is plugged in).

The physical lane creating units 90 set physical lanes that are the destinations of transport from the virtual lanes. For instance, the physical lane creating units 90 set a physical lane of 10 GbE (10 Gbps×1 ch) as a physical lane that is the transport destination of 6.5 Gbps×2 VLs. The physical lane creating units 90 set physical lanes of 40 GbE (10 Gbps×4 ch) as physical lanes that are the transport destination of 6.5 Gbps×8 VLs. The physical lane creating units 90 set a physical lane of 16GFC (14 Gbps×1 ch) as a physical lane that is the transport destination of 6.5 Gbps×3 VLs.

The I/Fs 100 output, as reception data, the data strings received from the associated physical lanes of the physical lane creating units 90. This embodiment is not limited to this configuration. For example, the multiplexed data may be distributed among the m transport paths to be transported as parallel data.

<Example of Dynamic Circuit Change>

Figure 11:
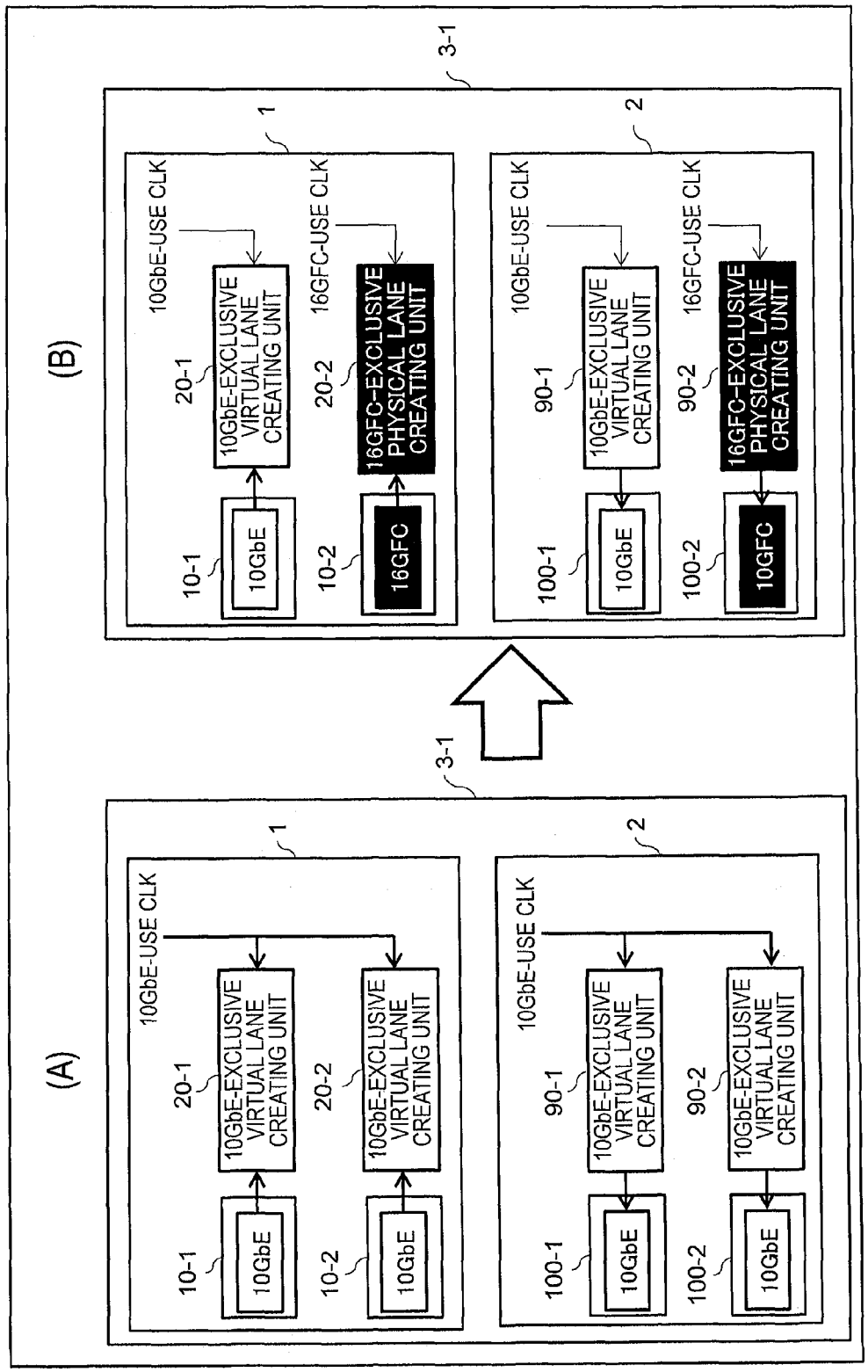
FIG. 11 is an block diagram illustrating an example of dynamically changing circuits that are included in the data transport system according to this embodiment.

FIG. 11 is a block diagram illustrating an example of dynamically changing circuits that are included in the data transport system according to this embodiment. When 10 GbE optical transceivers are plugged into physical ports of two I/Fs out of the I/Fs 10 in the transmission apparatus 1 of the transport apparatus 3-1, specifically, the I/F 10-1 and the I/F 10-2, the virtual lane creating units 20-1 and 20-2 which are associated with the I/Fs 10-1 and 10-2 become exclusive to 10 GbE in the transmission apparatus 1 of the transport apparatus 3-1. Similarly, when 10 GbE optical transceivers are plugged into physical ports of two I/Fs out of the I/Fs 100 in the reception apparatus 2 of the transport apparatus 3-1, specifically, the I/F 100-1 and the I/F 100-2, the physical lane creating units 90-1 and 90-2 which are associated with the I/Fs 100-1 and 100-2 become exclusive to 10 GbE in the reception apparatus 2 of the transport apparatus 3-1. Specifically, the 10 GbE-exclusive virtual lane creating units 20-1 and 20-2 and the 10 GbE-exclusive physical lane creating units 90-1 and 90-2 are adjusted in timing so as to operate on an operating clock frequency exclusive to 10 GbE.

In the case where the plugged optical transceiver is subsequently switched to a 16GFC optical transceiver at the I/F 10-2 out of the two I/Fs 10-1 and 10-2 in the transmission apparatus 1 of the transport apparatus 3-1, the virtual lane creating unit 20-2, which is exclusive to 10 GbE and which operates on an operating clock frequency different from that of 16GFC, cannot deal with 16GFC. Therefore, when the port information that informs of the plugging in of a 10GFC optical transceiver is received from the I/F 10-2, the virtual lane creating unit 20-2 connected to the 16GFC optical transceiver dynamically changes some of its circuits into circuits exclusive to 16GFC, and makes a timing adjustment so that the changed circuits operate on an operating clock frequency exclusive to 16GFC.

Similarly, in the case where the plugged optical transceiver is switched to a 16GFC optical transceiver at the I/F 100-2 out of the two I/Fs 100-1 and 100-2 in the reception apparatus 2 of the transport apparatus 3-1, the physical lane creating unit 90-2 included in the reception apparatus 2, which is exclusive to 10 GbE and operates on an operating clock frequency different from that of 16GFC, cannot deal with 16GFC. Therefore, when the port information that informs of the plugging in of a 16GFC optical transceiver is received from the I/F 100-2, the physical lane creating unit 90-2 connected to the 16GFC optical transceiver dynamically changes some of its circuits into circuits exclusive to 16GFC, and makes a timing adjustment so that the changed circuits operate on an operating clock frequency exclusive to 16GFC.

While the virtual lane creating units 20 and the physical lane creating units 90 are discussed in the description given here, this does not limit the range of circuit change. This also does not limit the type of optical transceivers plugged into the I/Fs 10, and a 10 GbE optical transceiver and a 40 GbE optical transceiver, for example, may be plugged in.

<Example of Operation Processing Steps of the Transport System>

Figure 12:
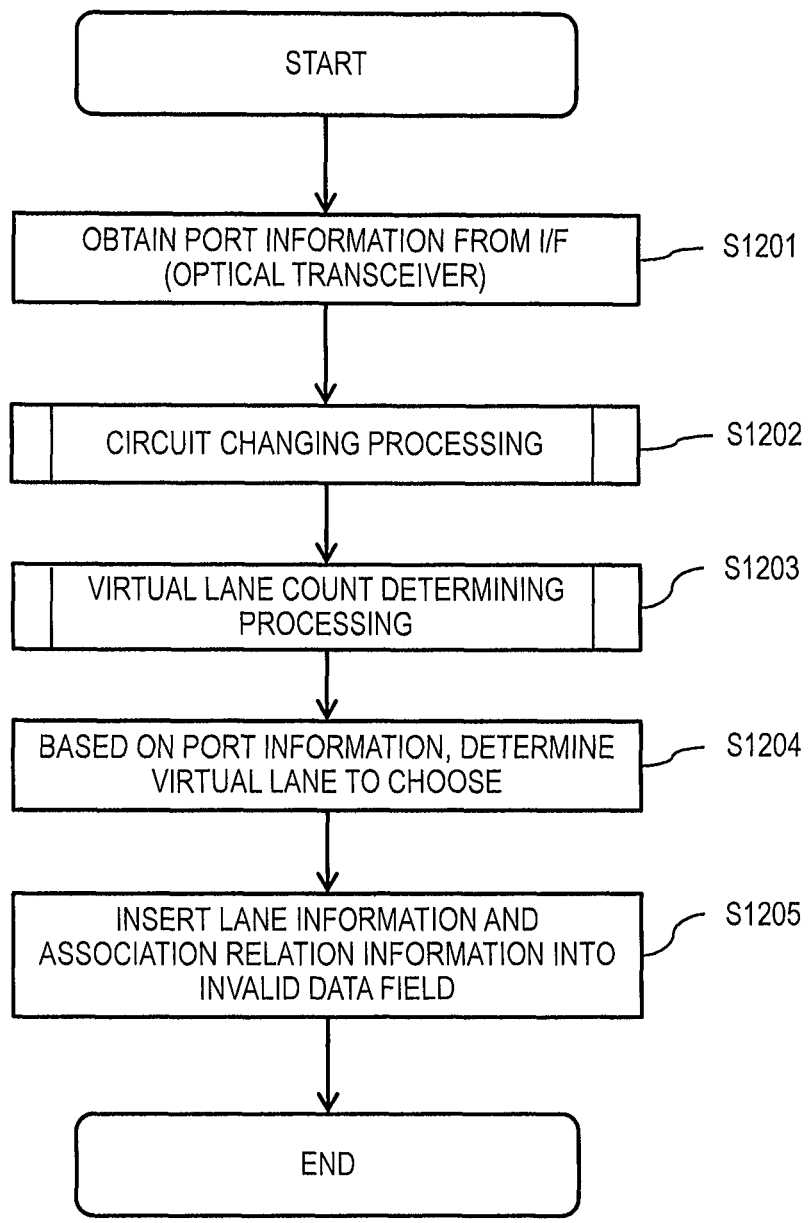
FIG. 12 is a flow chart illustrating an example of operation processing steps of the transmission apparatus 1 in the transport system.

FIG. 12 is a flow chart illustrating an example of operation processing steps of the transmission apparatus 1 in the transport system. With the plugging in of an optical transceiver as a trigger, the port information management unit 50 in the transmission apparatus 1 obtains the port information from the I/F 10 where this optical transceiver is plugged in (Step S1201). In the case where the optical transceiver plugged in is a 10 GbE optical transceiver, for example, the port information management unit 50 obtains an optical transceiver type "10 GbE", a transport rate "10.3125 Gbps", and a physical lane count "1" as the port information from the I/F 10 in question.

The port information management unit 50 next executes circuit changing processing (Step S1202). The circuit changing processing (Step S1202) is processing of executing circuit reconfiguration as the one illustrated in FIGS. 11A and 11B. Details of the circuit changing processing (Step S1202) are described later.

After the circuit changing processing (Step S1202), the port information management unit 50 executes virtual lane count determining processing (Step S1203). The virtual lane count determining processing (Step S1203) is processing of determining the count of virtual lanes into which physical lanes are converted. Details of the virtual lane count determining processing (Step S1203) are described later.

Next, the lane information creating unit 60 creates the lane information 701 from the port information obtained in Step S1201, and determines virtual lanes to choose (Step S1204). To give a concrete example, the virtual lane count is determined as "2" for 10 GbE in Step S1203. The lane information creating unit 60 accordingly creates the lane information 701 as the one illustrated in FIG. 7 and identifies the virtual lane numbers of virtual lanes to be used.

When data is subsequently input to the transmission apparatus 1, the multiplexing unit 40 performs multiplexing processing on the transmission data as illustrated in FIG. 6 (Step S1205), and transmits the multiplexed data to the reception apparatus 2. When multiplexing the transmission data, the multiplexing unit 40 inserts the lane information 701 and association relation information of the transmission apparatus 1 in an invalid data field.

Figure 13:
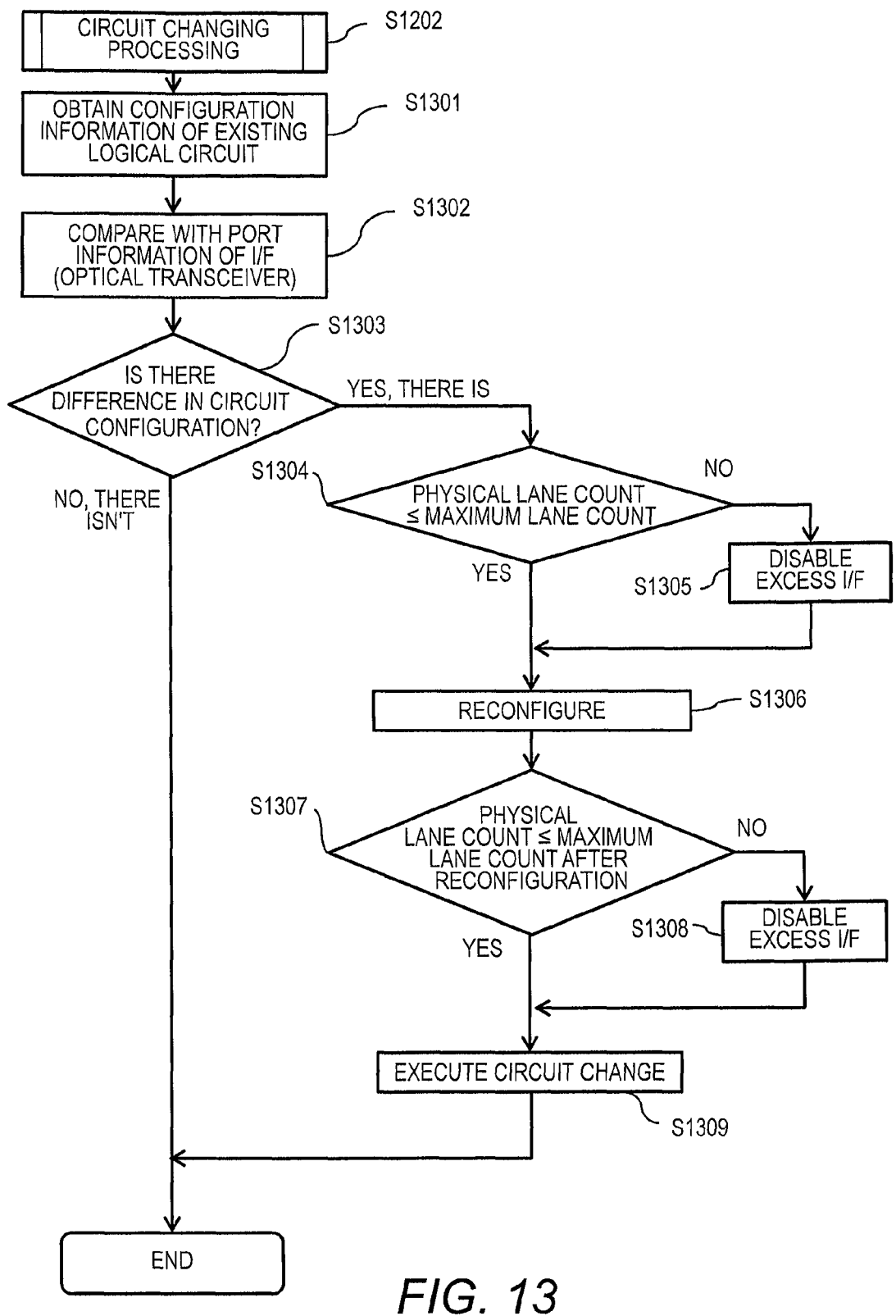
FIG. 13 is a flow chart illustrating an example of detailed processing steps of the circuit changing processing (Step S1202) of FIG. 12.

FIG. 13 is a flow chart illustrating an example of detailed processing steps of the circuit changing processing (Step S1202) of FIG. 12. The port information management unit 50 obtains configuration information of existing logical circuits (Step S1301). The configuration information of existing logical circuits is the circuit configurations of the virtual lane creating units 20. To give a concrete example, the circuit configuration of one virtual lane creating unit 20 is the transport rate and physical lane count of a physical port at the I/F 10 to which the virtual lane creating unit 20 is connected, and the transport rate and the physical lane count are obtained through the recognition of the connected I/F 10 by the virtual lane creating unit 20. The port information management unit 50 next compares the obtained configuration information of existing logical circuits (the transport rate and physical lane count recognized by the virtual lane creating unit 20) with the port information obtained in Step S1201 (the transport rate and physical lane count obtained from the I/F 10) (Step S1302).

The port information management unit 50 then determines whether or not there is a difference in circuit configuration (Step S1303). Specifically, when the same I/F 10 has the existing logical circuit configuration information in which the transport rate is "10. 3125 Gbps" and the physical lane count is "1", and the port information in which the optical transceiver type is "10 GbE", the transport rate is "10. 3125 Gbps", and the physical lane count is "1", for example, it is determined that there is no difference in circuit configuration because the transport rate and the physical lane count in the existing logical circuit configuration information are the same as the transport rate and the physical lane count in the port information.

When the same I/F 10 has the existing logical circuit configuration information in which the transport rate is "10. 3125 Gbps" and the physical lane count is "1", and the port information in which the optical transceiver type is "40 GbE", the transport rate is "10. 3125 Gbps", and the physical lane count is "4", on the other hand, it is determined that there is a difference in circuit configuration because the physical lane count in the existing logical circuit configuration information differs from the physical lane count in the port information. In this case, the circuit configuration of the virtual lane creating unit 20 needs to be changed from a circuit configuration exclusive to 10 GbE to a circuit configuration exclusive to 40 GbE. The port information management unit 50 determines that there is a difference in circuit configuration also when the transport rate alone differs between the existing logical circuit configuration information and the port information, and when the transport rate and the physical lane count both differ.

When there is no difference in circuit configuration (Step S1303: No), the port information management unit 50 ends the circuit changing processing (Step S1202) without reconfiguring circuits, and moves on to Step S1203. When there is a difference in circuit configuration (Step S1303: Yes), on the other hand, the port information management unit 50 compares the total physical lane count of the I/F 10 (a maximum lane count) in the existing circuit configuration with the (total) physical lane count in the port information obtained in Step S1201 (Step S1304).

In the case where the physical lane count in the port information obtained in Step S1302 is equal to or less than the maximum lane count in the existing circuit configuration (Step S1304: Yes), it means that there are enough physical lanes and the port information management unit 50 proceeds to Step S1306. In the case where the physical lane count in the port information obtained in Step S1302 is more than the maximum lane count in the existing circuit configuration (Step S1304: No), on the other hand, it means that there is a shortage of physical lanes. Accordingly, the I/Fs 10 that are associated with physical lanes in short supply are disabled by a user's operation (Step S1305), and the port information management unit 50 moves on to Step S1306. The I/Fs 10 are disabled by, for example, setting so that data received by the I/Fs 10 is discarded.

In Step S1306, the port information management unit 50 reconfigures the circuit configuration as instructed by the user's operation (Step S1306). For instance, the user switches an optical transceiver if necessary. At this state, the I/F 10 where the optical transceiver is switched is not enabled yet. When the optical transceiver of one I/F 10 is switched to a different optical transceiver, this I/F 10 notifies the port information. The physical lane count after the reconfiguration is the sum of physical lane counts in pieces of the port information obtained from the respective I/Fs 10 where optical transceivers are plugged in. For instance, in the case where two 10 GbE optical transceivers are plugged in before reconfiguration and then one of the two optical transceivers is switched to a 40 GbE optical transceiver, the physical lane count after the reconfiguration changes from "2" to "5".

The port information management unit 50 then compares the physical lane count after the reconfiguration with the physical lane count in the port information obtained in Step S1201 (Step S1307). When the physical lane count in the port information obtained in Step S1201 is equal to or less than the physical lane count after the reconfiguration, (Step S1307: Yes), it means that there are enough physical lanes, and the port information management unit 50 proceeds to Step S1309. When the physical lane count in the port information obtained in Step S1201 is more than the physical lane count after the reconfiguration, (Step S1307: No), it means that there is a shortage of physical lanes. Accordingly, the I/Fs 10 that are associated with physical lanes in short supply are disabled by the user's operation (Step S1308), and the port information management unit 50 moves on to Step S1309. The I/Fs 10 are disabled by, for example, setting so that data received by the I/Fs 10 is discarded.

Thereafter, the port information management unit 50 uses the post-reconfiguration port information to execute the circuit change of the virtual lane creating unit 20 in the manner illustrated in FIGS. 11A and 11B (Step S1309). This enables the I/Fs 10 after the reconfiguration, thereby settling the post-reconfiguration transport rate and physical lane count, and the circuit changing processing (Step S1202) is ended. In the case where an optical transceiver is switched at one I/F 10 in the circuit changing processing (Step S1202), the user switches the optical transceiver of the I/F 100 on the reception apparatus 2 side that is associated with this I/F 10 to an optical transceiver of the same type as that of the new optical transceiver of the I/F 10.

Figure 14:
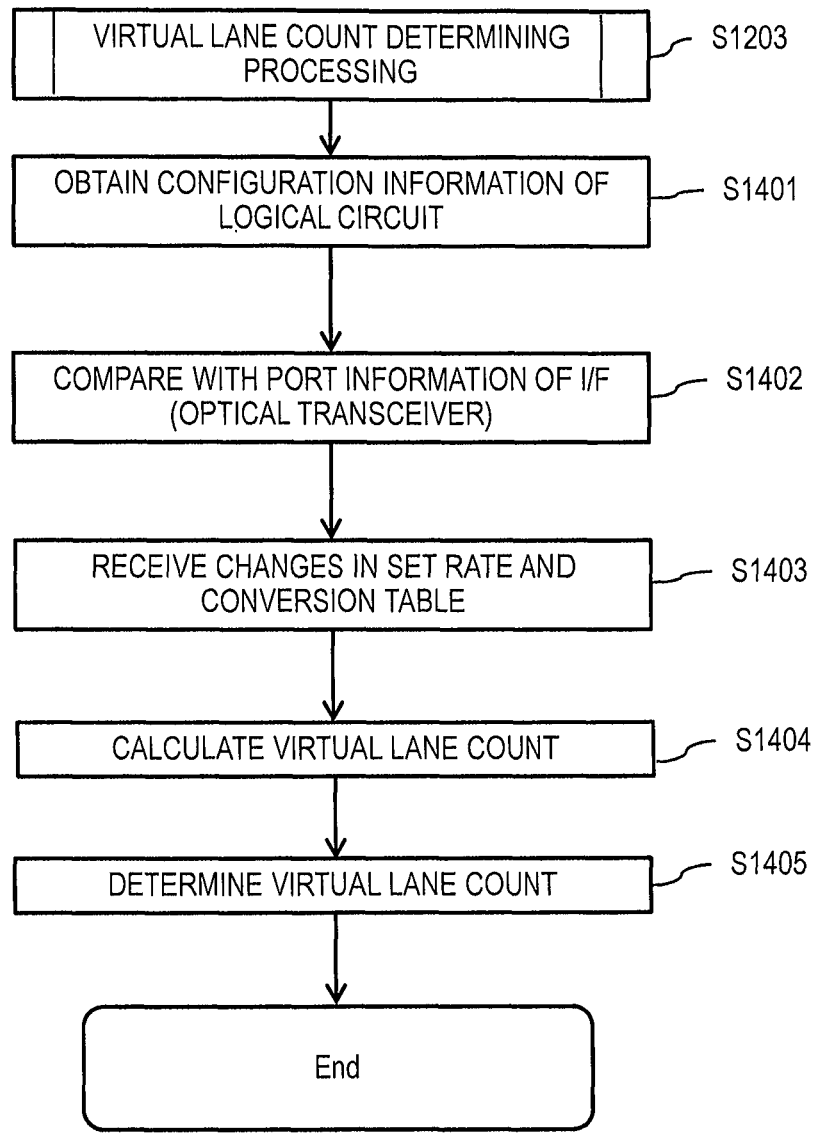
FIG. 14 is a flow chart illustrating an example of detailed processing steps of the virtual lane count determining processing (Step S1203).

FIG. 14 is a flow chart illustrating an example of detailed processing steps of the virtual lane count determining processing (Step S1203). First, the port information management unit 50 obtains configuration information of logical circuits of the virtual lane creating unit 20 (the transport rate and physical lane count of a physical port at the I/F 10 recognized by the virtual lane creating unit 20) (Step S1401). Specifically, in the case where the circuit configuration has been changed in the circuit changing processing (Step S1202), for example, the configuration information after the change is obtained, and the same configuration information as the one obtained in Step S1301 is obtained in the case where the circuit configuration has not been changed.

The port information management unit 50 next compares the logical circuit configuration information obtained in Step S1401 with the port information obtained from the I/F 10 (Step S1402). Steps S1401 and S1402 are the same processing as Steps S1301 and S1302. This allows the user to check whether or not there has been a change in set rate.

The port information management unit 50 next receives changes to the set rate and to the conversion table 500 (Step S1403). In the case where a circuit change has been executed in the circuit changing processing (Step S1202), the set rate x needs to be changed. The set rate is changed by the user's operation. In the case where a change to the set rate x is executed, the changed set rate x is to be changed in the conversion table 500 as well. The port information management unit 50 calculates a virtual lane count for each entry of the conversion table 500, thereby updating the column for the virtual lane count (Step S1404). The port information management unit 50 then refers to the updated conversion table 500 to determine the count of virtual lanes into which physical lanes are converted (Step S1405). After the virtual lane count is determined, the associated virtual lane creating unit 20 creates as many virtual lanes as the determined virtual lane count.

In the case where the set rate x is changed, the changed set rate x is inserted in an invalid data field when the transmission data is multiplexed by the multiplexing unit 40. The reception apparatus 2 can thus obtain the changed set rate x, and change the internal virtual lane transport capacity to the changed set rate x.

Figure 15:
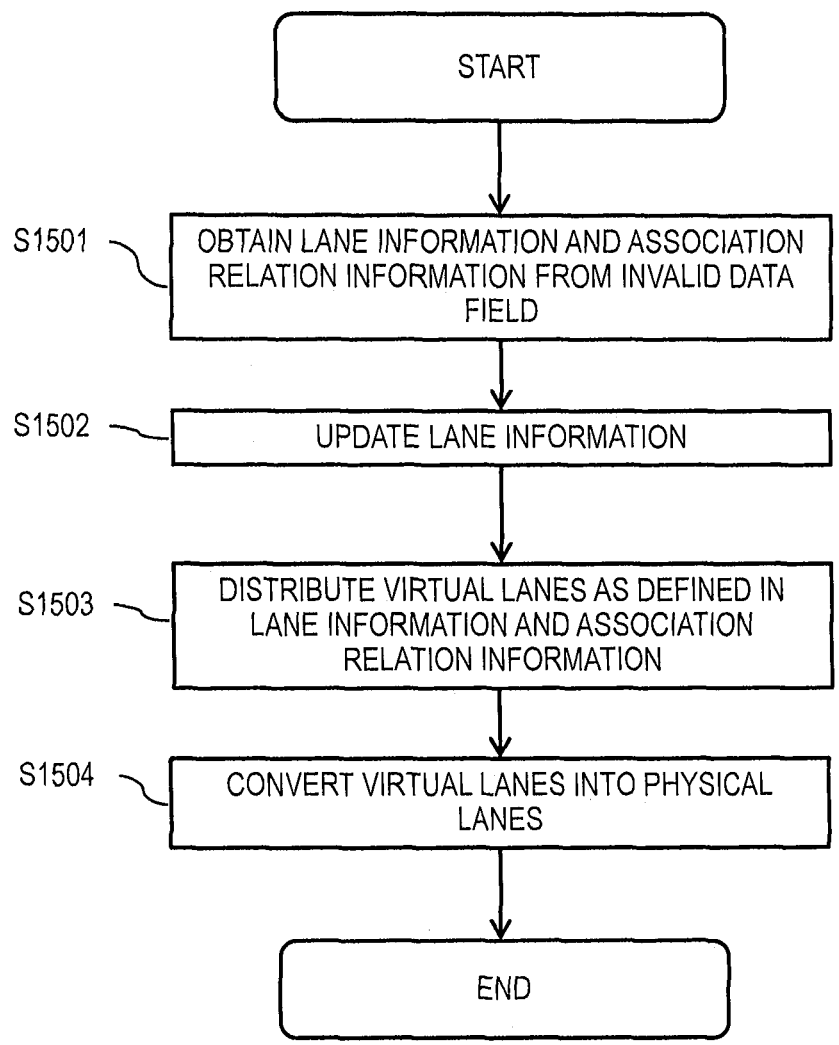
FIG. 15 is a flow chart illustrating an example of operation processing steps of the reception apparatus in the transport system.

FIG. 15 is a flow chart illustrating an example of operation processing steps of the reception apparatus 2 in the transport system. The demultiplexing unit 70 in the reception apparatus 2 receives transmission data from the transmission apparatus 1, and obtains, from an invalid data field included in the received data string, the lane information 701 and the association relation information which have been inserted by the transmission apparatus 1 (Step S1501). Next, the second selector 80 updates the current lane information with the lane information 701 obtained in Step S1501 (Step S1502). The lane information 702 is obtained in this manner.

The second selector 80 then distributes virtual lane numbers to the physical lane creating units 90 as defined in the association relation information (Step S1503). For instance, because a used physical lane count that is registered in association with the virtual lane numbers "1" and "2" in the lane information 702 is "1", the virtual lane numbers "1" and "2" are distributed to the I/F 100 where a 10 GbE optical transceiver is plugged in (e.g., the I/F 100-1).

The second selector 80 may change the lane information 701 obtained in Step S1501 to create new association relations by the user's operation. For example, in the case where the virtual lane numbers "1" and "2" which are for 10 GbE in the transmission apparatus 1 are associated with the virtual numbers "12" and "13" for 10 GbE in the reception apparatus 2, the lane information 701 is changed as illustrated in FIG. 8.

The physical lane creating units 90 set physical lanes as defined in the lane information 702 updated in Step S1502 (Step S1504). Transmission data transported via virtual lanes and selected by the second selector 80 is thus transported along the set physical lanes and output from the I/Fs 100 as illustrated in FIG. 10.

In this manner, the transport system according to this embodiment is capable of multiplexing data that is received by a plurality of physical ports, including multi-lane transport, and transporting the multiplexed data. This embodiment can also provide a data transport apparatus that is small in size and delay amount and is capable of multiplexing and demultiplexing data without being dependent on particular link-layer protocols and transport lane counts, even when the data is to be transported in a network where various link layer protocols are used mixedly.

In addition, the internal operation of the data transport apparatus is not affected by the contents and protocol of data transported. Accordingly, the length of processing time is guaranteed despite a difference in the protocol of input data. The delay in transport time can thus be kept small. More specifically, the delay in transport time can be kept small by multiplexing and demultiplexing pieces of transmission data from a plurality of physical ports where the protocol and the transport lane count differ from one physical port to another. Further, if implemented by a single circuit, a large-capacity data transport apparatus that is small in size and delay amount and that is capable of multi-rate transport is accomplished.

Another advantage is that lane information can be notified to the reception apparatus 2 without pushing up the transport capacity, by efficiently converting physical lanes into as many virtual lanes as a determined virtual lane count, and inserting the lane information in an invalid data field. Transport data can thus be multiplexed efficiently. This also helps to reduce the size of the data transport apparatus because the transmission apparatus 1 is capable of managing the port information and multiplexing and transmitting data by itself. The user may set a priority level to each physical port so that transmission data from a high-speed physical port where the transport rate is high is multiplexed or demultiplexed preferentially.

The port information management unit 50 and the lane information creating unit 60 may be provided in an external apparatus coupled to the transmission apparatus 1. For instance, a program that implements the port information management unit 50 and the lane information creating unit 60 may be installed in a personal computer coupled to the transmission apparatus 1 to function as the port information management unit 50 and the lane information creating unit 60. In other words, the personal computer serves as a control apparatus for controlling the transmission apparatus 1. In this way, the configuration of this embodiment can be implemented even when the transmission apparatus 1 does not include the port information management unit 50 and the lane information creating unit 60.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A transport system, including:
a first transport apparatus for transporting data that is received by a plurality of first interfaces; and
a second transport apparatus for receiving data that is transported from the first transport apparatus and transmitting the data from a plurality of second interfaces,
the first transport apparatus including:
a port information management unit for obtaining, for each of the plurality of first interfaces, port information which includes a type of the each of the plurality of first interfaces, a transport rate of the each of the plurality of first interfaces, and a physical lane count of physical lanes leading from the each of the plurality of first interfaces into the first transport apparatus, and for determining, based on the obtained port information, a virtual lane count of virtual lanes into which the physical lanes leading from the each of the plurality of first interfaces are converted;
virtual lane creating units, which are each connected to physical lanes leading from the each of the plurality of first interfaces, for setting, for the each of the plurality of first interfaces, as many virtual lanes as the virtual lane count determined by the port information management unit;
a lane information creating unit for creating, based on the port information, lane information which associates the each of the plurality of first interfaces, the physical lane count of physical lanes leading from the each of the plurality of first interfaces, and identification information of virtual lanes that are set by the virtual lane creating units in association with the physical lanes; and
a multiplexing unit for multiplexing data that is transported along the virtual lanes, and for inserting the lane information which has been created by the lane information creating unit in an invalid data field which is generated when the data is multiplexed,
the second transport apparatus including:
a demultiplexing unit for receiving the multiplexed data which has been multiplexed by the multiplexing unit, and for obtaining the lane information while demultiplexing the multiplexed data for the each of the plurality of first interfaces separately; and
physical lane creating units, which are connected to virtual lanes leading from the demultiplexing unit, for setting, based on the lane information obtained by the demultiplexing unit, for each of the plurality of second interfaces, physical lanes that are connected to the each of the plurality of second interfaces.

2. The transport system according to claim 1, wherein, when any one of the plurality of first interfaces is changed in type, one of the virtual lane creating units that is connected by physical lanes leading from the changed one of the plurality of first interfaces changes its own circuit configuration to a circuit configuration suitable for the changed type of the one of the plurality of first interfaces.

3. The transport system according to claim 1, wherein the multiplexing unit counts how many times in succession multiplexing has been executed without generating the invalid data field and, when the counted multiplexing count exceeds a given count, generates the invalid data field during multiplexing to insert the lane information in the invalid data field generated.

4. A transport apparatus for transporting data that is received by a plurality of first interfaces, including:
a port information management unit for obtaining, for each of the plurality of first interfaces, port information which comprises a type of the each of the plurality of first interfaces, a transport rate of the each of the plurality of first interfaces, and a physical lane count of physical lanes leading from the each of the plurality of first interfaces into the transport apparatus, and for determining, based on the obtained port information, a virtual lane count of virtual lanes into which the physical lanes leading from the each of the plurality of first interfaces are converted;
virtual lane creating units, which are each connected to physical lanes leading from the each of the plurality of first interfaces, for setting, for the each of the plurality of first interfaces, as many virtual lanes as the virtual lane count determined by the port information management unit;
a lane information creating unit for creating, based on the port information, lane information which associates the each of the plurality of first interfaces, the physical lane count of physical lanes leading from the each of the plurality of first interfaces, and identification information of virtual lanes that are set by the virtual lane creating units in association with the physical lanes; and
a multiplexing unit for multiplexing data that is transported along the virtual lanes, and for inserting the lane information which has been created by the lane information creating unit in an invalid data field which is generated when the data is multiplexed.

5. The transport apparatus according to claim 4, wherein, when any one of the plurality of first interfaces is changed in type, one of the virtual lane creating units that is connected by physical lanes leading from the changed one of the plurality of first interfaces changes its own circuit configuration to a circuit configuration suitable for the changed type of the one of the plurality of first interfaces.

6. The transport apparatus according to claim 4, wherein the multiplexing unit counts how many times in succession multiplexing has been executed without generating the invalid data field and, when the counted multiplexing count exceeds a given count, generates the invalid data field during multiplexing to insert the lane information in the invalid data field generated.

* * * * *